ELECTRICAL IMPULSE TRANSMITTING DEVICE

Filed July 19, 1950 5 Sheets-Sheet 1

Inventor
Paul F. M. Gloess
By Ralph B. Stewart
Attorney

INVENTOR
Paul F. M. Gloess
By Ralph B. Stewart
Attorney

May 18, 1954 P. F. M. GLOESS 2,679,040

ELECTRICAL IMPULSE TRANSMITTING DEVICE

Filed July 19, 1950 5 Sheets-Sheet 3

Inventor
Paul F. M. Gloess
By Ralph B. Stewart
Attorney

INVENTOR
Paul F. M. Gloess
By Ralph B. Stewart
Attorney

May 18, 1954 P. F. M. GLOESS 2,679,040

ELECTRICAL IMPULSE TRANSMITTING DEVICE

Filed July 19, 1950 5 Sheets-Sheet 5

INVENTOR
Paul F. M. Gloess
By Ralph B. Stewart
attorney

Patented May 18, 1954 2,679,040

UNITED STATES PATENT OFFICE 2,679,040

ELECTRICAL IMPULSE TRANSMITTING DEVICE

Paul François Marie Gloess, Paris, France, assignor to Societe d'Electronique et d'Automatisme, Paris, France, a corporation of France Application July 19, 1950, Serial No. 174,714

Claims priority, application France July 25, 1949

3 Claims. (Cl. 340—345)

The present invention relates to improvements in electrical impulse transmitting devices and has for its principal purpose the removal of drawbacks resulting from the loss of the direct current component of a coded impulse train when passed through capacitive connections between the various circuits in which said train is to be successively operated upon, without it being necessary, at any location to resort to the use of circuits or means for recovering or restoring said direct current component, said circuits or means being well known in the practice of television signal transmission.

In such transmitting of coded impulse train, the presence of said D. C. component insures a constant setting of the impulse base levels to a reference level taken as zero value for the various circuits such as amplifying and crest cutting (clipping) circuits (in general any pulse regenerating or shaping circuits) and consequently the suppression of said component entails, in most cases, operating defects of said circuits, such as shifting the impulses of one impulse train relatively to said reference level, in a way all the more noticeable that the number of impulses in the train is larger and that the individual duration of the impulse is greater with reference to the duration of the intervals between said impulses. Up to the present time this defect was removed either, as above mentioned, through inserting circuits for recovering said D. C. component, or (and preferably) in combination with such circuits, through the provision of impulses the individual durations of which are the smallest possible with relation to the intervals between them. Either one or both these expedients are evidently not advantageous from an economical point of view.

To eliminate such expedients, the present invention generally foresees not to resort to a recovering of the D. C. component, nor, either, to impulse definitions which are considered as prohibitive by reason of the complicated embodiments of the circuits they need, but to locally modify the shape of the impulses of a coded train, by giving them such a shape that the independence of the level characteristics of a train relatively to its D. C. component is ensured. Now, it is well known in the art of communications that signals presenting such a characterization are signals comprising, in each of their elements, pulses of double polarity, such as two alternations at least, of a sinusoidal wave or, more generally, any two alternation impulsed signal. Thus, it is into such impulse signals that the present invention operates to convert or shape the impulses of a coded impulse train whenever such train, after having lost its D. C. component, must be operated upon in a device the correct operation of which would be ensured by said D. C. component.

Figure 1:
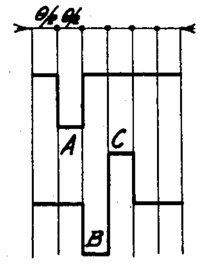

Referring to Fig. 1 of the appended drawings, at A a single polarity pulse is shown, such as it would appear in a coded impulse train while being transmitted (of course, the particular polarity illustrated is of no importance) and at B—C the appearance of said pulse A is also shown after conversion into an impulse signal of the double polarity type. Moreover, it has been assumed in this example that the width or duration of impulse A, or of each of corresponding impulses B and C is equal to one half-cycle $\theta/2$ of the possible recurrence of said impulses in a coded train transmitted in the considered system. However it is to be well understood that said width of duration in any embodiment of the invention may have a value less than to $\theta/2$, in any application of the present invention, said width being purely illustrative and having been chosen for the sole reason that it provides a convenient terminology and to then assume that a one-direction impulse A is converted into a carrier current impulse B—C, the period of which is $\theta$.

Moreover, in Fig. 1, a shift of $\theta/2$ is shown, between original impulse A and impulse B of the impulse signal (and consequently a shift $\theta$ between impulse A and impulse C of said impulse signal, with opposed polarity) for the sole reason that in numerous cases it is advisable to use such a shift, so that, in the transmission device in which an impulse train having lost its D. C. component is treated, operation may occur, at least partially with the opposed polarity, while remaining in the opening periods of the elements of this circuit through timing sustaining impulses (for the purpose of the duration regeneration of the impulses) with a spacing of $\theta/2$, and that said timing sustaining impulses be evidently synchronous which train impulses such as A, so as to admit said train impulses into the device.

Generating impulse signals having above-mentioned alternation characterization, from unipolar impulses of a coded train would of course be possible by using a generator having the corresponding wave-form (for instance, a sinusoidal generator followed by a double trimming device) released for one cycle by each of the incident train impulses. However, according to a more particular feature of the present invention, it is arranged to derive such signals directly from the unipolar impulses of an impulse train by applying for such purpose the well known property of a delaying line (artificial line) section to reflect, with a polarity inversion, any applied impulse whenever said line is terminated by a shortcircuit. Consequently the present invention incorporates in the coded impulse train transmission equipments, at all places where it is necessary according to the above considerations, an arrangement such as diagrammatically shown in Fig. 2.

Figure 2:
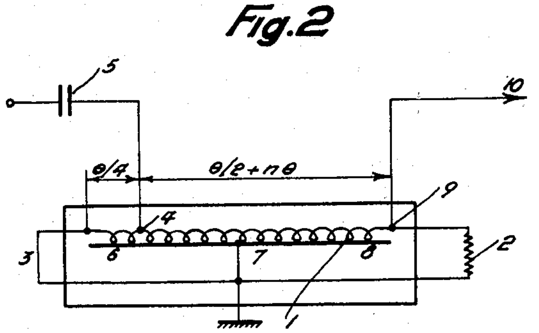

In Fig. 2, a delaying line 1 is terminated at one end by its characteristic impedance 2 and at the other end by a short-circuit 3. Said line is excited at 4, through decoupling capacitor 5, at a distance of $\theta/4$ from the short-circuit and the distance between input tap 4 and output tap 9 is chosen equal to an odd number of intervals $\theta/2$. In Fig. 2, this part of the line has been shown as made of a section 7 with a transit time $\theta/2$, followed by series of sections the overall transit time of which is $N\theta$, N being an even number because, in several applications, it shall be sufficient in fact, to adopt as output terminal the tap terminating section 7.

Now it is clear that functions of taps 4 and 9 may be interchanged without causing any change in the operation of the above-described arrangement, output lead 10 being then considered as impulse input lead and capacitor 5 as connecting capacitor to a loading, or utilisation device. This apparent reversal of operation is due to the fact that the knowledge of the particular place in line 1 where the desired impulse shape conversion has occurred is unimportant to the following apparatus.

Moreover, it is within the scope of the invention to provide a modification to the above arrangement including two short-circuits, at both ends of the line. Indeed, in many cases in which a long line is to be used, said line causes a large attenuation of signals, and more particularly of the higher frequency components of said signals and the output signal is then so distorted that it causes an unsatisfactory operation of the following regenerative circuit. In order to eliminate such a disadvantage, it is arranged to reinstall the short-circuit termination at the output end (or vice-versa), this second converter circuit then acting only as an attenuation converter, as the signals have no D. C. component so as, to balance, in a certain measure, the attenuation law, varying with the line frequency and to reinstate more satisfactory signal shapes.

Having thus set forth the general features of the present invention and the preferred manner of their employment according to Figs. 1 and 2, certain particular embodiments are now to be described, in relation with the three following cases, as non-limitative illustrations.

Figure 3:
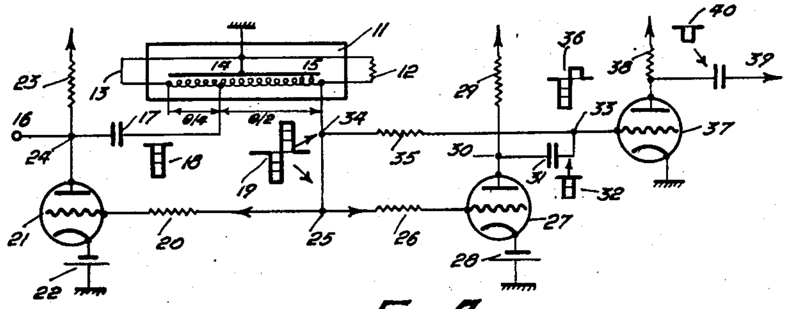
Figure 4:
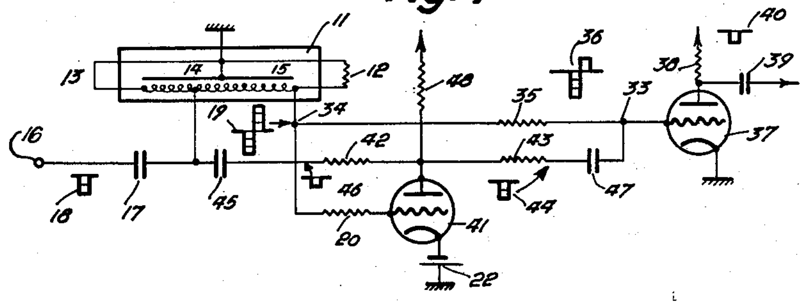
Figure 5:
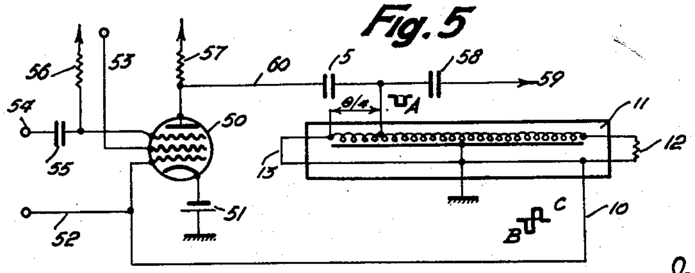
Figure 6:
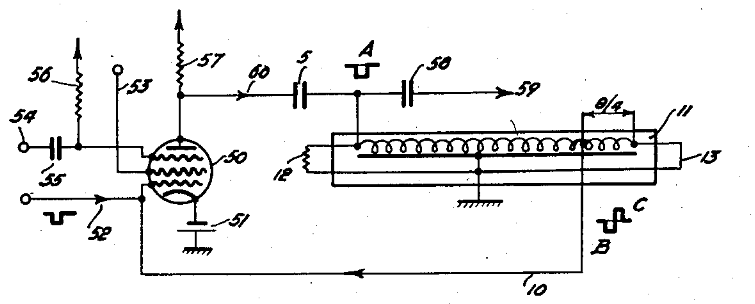
Figure 7:
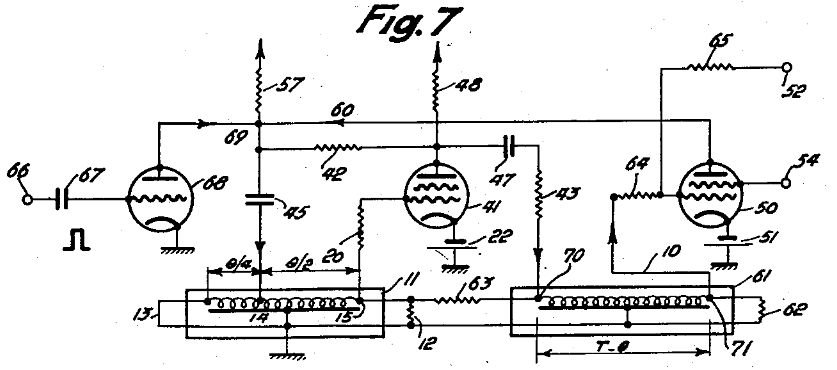
Figure 8:
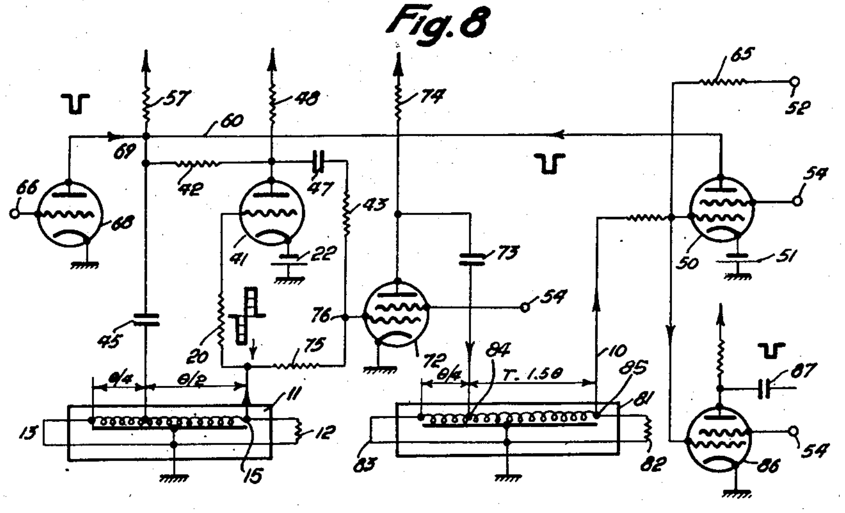

Figs. 3 and 4 show the correction of a rough product of an addition of two or more coded impulse trains, into a net product carrying the result of this addition or totalization, Figs. 5 and 6 show the sustaining of a coded impulse train registered in a storage member of the incorporated delaying line type, and Figs. 7 and 8 show the totalization of coded trains in such a storage member, with simultaneous sustaining of the resulting impulse train.

These three illustrative embodiments are interesting because they show clearly not only various uses of the arrangement shown in Fig. 2, said arrangement being limited in Figs. 3 and 4 to a line having an overall transmitting time $\theta$, and being extended in Figs. 5 and 6 to a line the transit time of which is $(N+1)\theta$, but also, in Figs. 7 and 8, the application of the same arrangement as a complex delaying line, in view of a definite combination of functions, in a transmission device.

Referring first to both "carry-over operators" two or more impulse trains are mixed at input terminal 16 and transmitted through connecting capacitor 17, to the input tap 14 of a delaying line 11, terminated at one end (at a distance $\theta/2$ from tap 14) by its characteristic impedance 12 and, at the other end (at a distance $\theta/4$ from tap 14), by a short-circuit 13, $\theta$ being the assumed timing interval of said mixed impulse trains.

Mixing both trains provides, at certain impulse positions, levels of twice the unit level value, said unit level being besides arbitrarily determined and, after a partial carry-over operation such as will hereafter be explained, may even give at tap 14, impulses such as 18, bearing three levels. Now, in the operation of a carry-over operating device, it is important to well define the impulse levels of a coded impulse train, owing to the fact that the analysis is applied to the detection of the levels the value of which is twice or thrice that of the unit level. Now, in the previous mixing, and preferably besides it, a regeneration of the impulses comprising a crest cutting and/or an amplification was performed and consequently the rough input train has generally lost its D. C. component. Thus, prior to any operation on the uncorrected train, and during its correction, it is arranged to convert the impulses into impulse signals such as above mentioned, whence the provision of delaying line 11. At the output terminal 15 of said line, each impulse in the train has been converted into an impulsed signal such as 19 (showing the extreme case of three amplitude levels for the totalization of two trains).

Moreover, the insertion of this delaying line with overall transit time $\theta$ automatically ensures a delay $\theta$ for the train impulses. Therefrom results that, as a modification of the carry-over operating device dispositions mentioned according to the present invention, it will no more be necessary to provide this delay $\theta$ by means of a particular delay member in the carry-over circuit of a unit impulse, generated through detection of a double or treble level in the impulse of an order K on the term of an order $K+1$. This carry-over operation is effected (Fig. 3) owing to the fact that the impulse signal 19 is applied at 25 and that said signal, through calibration resistance 20, actuates threshold tube 21 (biased for instance at 22 by cathode bias), so that said tube applies a negative unit level impulse on terminal 24 (23 being the anode resistance of tube 21) which impulse is consequently added to the impulse of a time of higher order, if any.

Simultaneously, signal 19 is transmitted through terminal 25 and calibration resistor 26 to tube 27, biased for instance at 28 by its cathode, and operating also as a multiple level detector. However, this tube (the anode resistance of which is shown at 29) delivers, when actuated, a pulse 32, the level of which has a value equal to twice that of the unit level, and the polarity and occurrence time of which are such that said pulse is subtracted from signal 19, transmitted through terminal 34 and decoupling resistor 35 to common point 33, to which the output of tube 27 is connected through decoupling capacitor 31. The result is that there appears at point 33 a signal of the form shown at 36 which, being applied to tube 37 (the anode resistance of which is shown at 38) causes, at the output terminal of said tube, the formation of an impulse 40, at unit level, which is then transmitted to the following circuits of the system through connecting capacitor 39.

As shown in Fig. 4 the function of threshold tubes 21 and 27 may be fulfilled by only one tube 41, the output of which is branched through resistors 42 and 43, to apply again the impulse generated by said tube, one to tap 14 of line 11 through connecting capacitor 45, and the other through connecting capacitor 47 to input terminal 33 of tube 37. Resistor 42 insures the application to tap 14 of a unit level impulse 46 at the time of order immediately higher than that of the analysed term, and said resistors 42 and 45 may be chosen of sufficient values to avoid the initiation of a parasitic routing for impulses such as generated by tube 41 and coming back along path 43—35 and such as those of the line output signal, coming back along path 35—43—42. The valves of said resistors shall consequently be relatively high with reference to the characteristic impedance of line 11 and to anode resistor 48 of tube 41, the latter resistor being chosen of considerably smaller value than the characteristic impedance of the line.

A simple numerical example will now be considered.

Figures 3A, 5A:
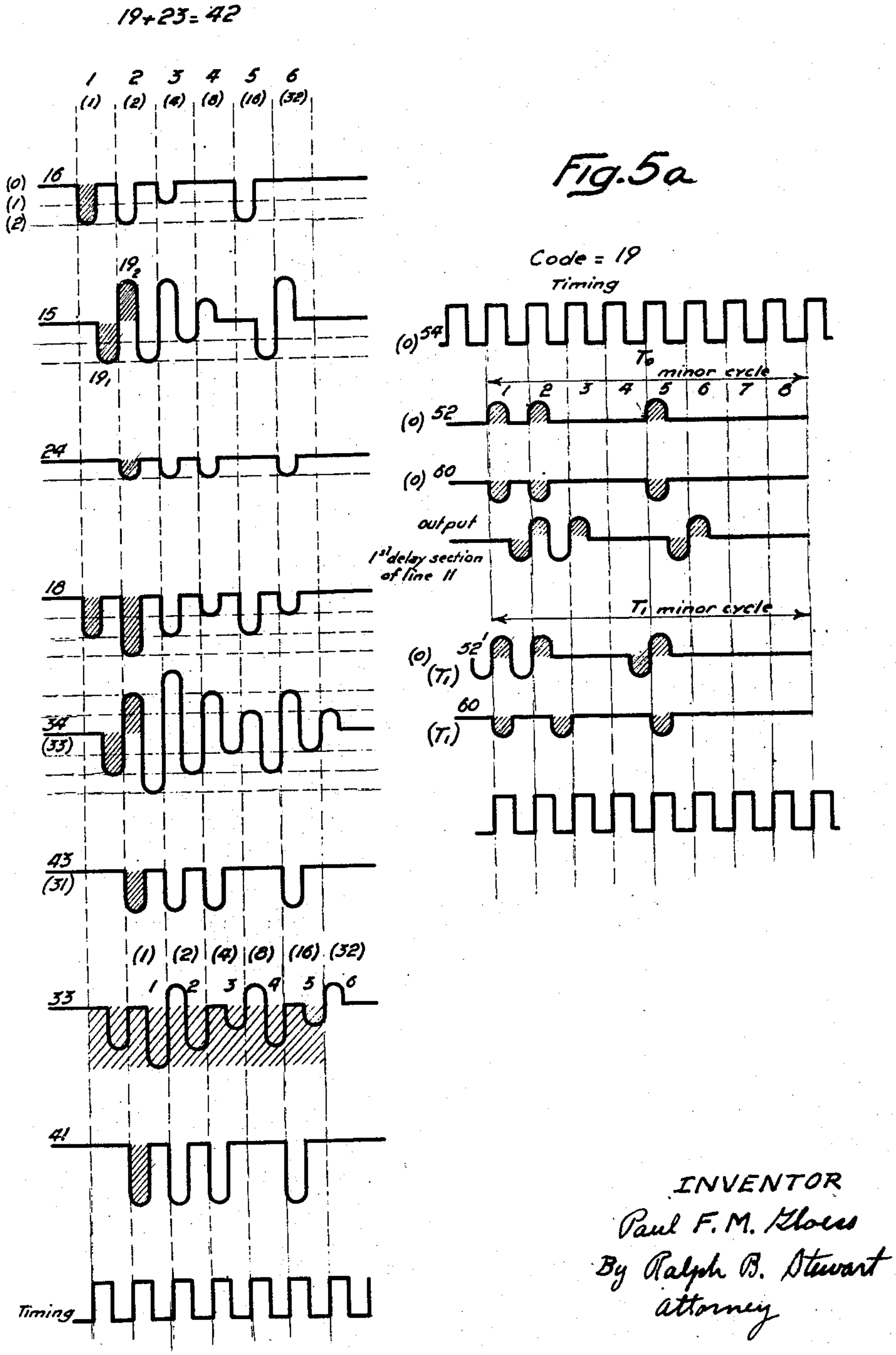

The coded train incoming at 16 in Figs. 3 and 4 is illustrated in the diagrams of Figure 3*a*. It shows the incorrect result (gross result) of the addition of pulses representing numbers 19 and 23 written in a binary numeration system. This incorrectly coded train shows impulses of double the unity level arbitrarily defined in its first, second and fifth moments, or pulse positions, one unity level impulse in its third moment and no concrete impulse in its fourth moment of the code. It is applied onto terminal 16 in negative impulse polarity.

At 15 is shown such a train after passing through delaying line 11. At 24 is shown the carry-over train supplied from the plate of tube 21 as the rectification operation is carried on. At 18 is shown the train resulting from the adding of trains 16 and 24 after passing through delaying line 11.

At 43 is shown the train of pulses produced by tube 27 of Fig. 3, or, what is the same, the train at the output end of resistor 43 of Fig. 4. At 33 of Fig. 3*a* is shown the train on the input of the output tube 37. At 41 is shown the train at the output of tube 41 of Fig. 4.

At the first code moment, or pulse position, the first moment impulse of the train incoming at 16 is applied at 14 on the input of the delaying line 11. This impulse travels along the line in two parts, each following a travelling direction. The part or pulse of energy directed towards output terminals 15 is delayed by $\theta/2$, and therefore comes out of the line at this first code moment, as indicated in $19_1$ on graphs 15 and 34. It constitutes the first alternation of the two-alternation pulse signal established in line 11. The second alternation of the pulse signal is produced by the energy reflected from short-circuit 13 and is reversed in polarity. The echo time, or the time required for the pulse to travel from point 14 to short-circuit 13 and return to point 14 is $\theta/2$; after another period of time $\theta/2$, this positive alternation appears at terminal 15 of the delaying line 11.

The pulse signal is therefore delayed by a period of time $\theta/2$ in relation to the incoming unipolar negative impulse, and the positive alternation of this pulse signal is delayed by a period of time $\theta$, which is the duration of one code moment, in relation with said incoming negative impulse. This signal is applied both onto tubes 21 and 27. As has been hereabove stated, these two tubes are polarized so that their operating threshold (cut-off) is greater than a positive unity level. On the other hand, the constants of their plate circuits (plate resistors, feeding voltage for example) are adjusted to provide a unity output level for tube 21, whereas the output level of tube 27 is equal to double the unity level.

As a result of applying, at the first code moment, an impulse of a level double that of the unity level, the tube 21 delivers, at the beginning of the second code moment, at point 24, a positive impulse of unity level. Tube 27 delivers, at 30, a double level impulse. These impulses are phased with the negative impulses at 16 at the second code moment, and also phased with the positive alternation of the prior pulse signal at 33.

Tube 37, therefore, receives the negative alternation of the first code moment pulse signal (not utilized in the output of said tube); it does not receive any voltage at the beginning of the second code moment since the positive alternation of the pulse signal and the negative impulse outcoming from tube 27 reciprocally annul each other.

Because the delay $\theta$ has been introduced in the transmitting channel, the code moments are shifted all together by a delay $\theta$ in their carry-over operation.

The negative unity impulse supplied at 24 is added to the negative impulse of level two, incoming at 16 at this second code moment, so that the negative impulse applied at 14 on the input of the delaying line is of a negative level of three.

The above-mentioned process is repeated for the third code moment. Operation of tubes 21 and 27, at the beginning of the third code moment, produces a negative impulse at 24 which is added to the train impulse incoming at that moment at 16; these tubes also effect reduction to unity level (3—2) of the positive alternation of the signal at the input of tube 37.

It is to be noticed that the negative sections of the pulse signals may be directly suppressed by tube 37 through grid or cathode polarization.

Adding the train incoming at 16 and the carry-over train at 24 results in the train 18 which is applied to the input of line 11. This coded train appears at the output of line 11 in the form shown at 34 in Figure 3*a*.

Subtracting two trains 34 and 43 (31) results in the train indicated at 33 which carries the code correctly representing the number 42, which is the sum of numbers 19 and 23.

Referring to Fig. 4, the process is the same except for the fact that, in consideration that the configurations of the carry-over train 24 and of the double-level annulling train 43 are the same up to unity amplitude level, it has been arranged to shunt these two trains by potential drop resistors 42 and 43 from the plate of the single tube 41, which is biased so as to become conducting only when the input signal exceeds the unity level, and limited, of course, in its restitution level to an amplitude level greater than level two, as indicated on curve 41.

Considering now the diagrams shown in Figs. 5 and 6, in which the present invention is applied to storage with delaying line back coupled through an impulse regenerating stage (tube 50), it may be seen that arrangement of Fig. 2, in Fig. 5, or the reciprocal arrangement, in Fig. 6, is incorporated to the delaying line of the storage member so as to insure the application to return lead 10 of the loop and consequently to the peak cutting grid of tube 50, with cathode bias as shown at 51, of impulse signals B—C as substitutes for unipolar impulses which would be directly derived from A.

In such storage members, the D. C. component of an impulse train, whether at input terminal 52 or while circulating around loop 11—10—50—60—11, is indeed lost when the train passes through connecting capacitor 5. The need of this D. C. component is still more noticeable yet in this case than in the one preceding, as said need provokes a damaging of impulses which is all the more pronounced when the number of stored impulses is greater. The insertion of the disposition of the conversion of impulses into two alternations impulse signals causes the detection in the grid-cathode space of tube 50, of the positive crest of alternation SC, in the intervals of unlocking of said tube through the timing sustaining or restoring impulses applied through terminal 54 and coupling capacitor 55 to the suppressor grid (or other electrode) of the tube. At 56 a bias resistor is shown for said suppressor electrode, at 53 the input terminal for a screen voltage, at 57 the anode resistor, at 59, a pick-up channel, through connecting capacitor 58, for signals stored in the loop memory member.

In such members the individual duration of alternations B and C of the impulse signal is determined, on the one hand, by the duration of regenerating impulses applied at 54 and, on the other, by the transmission characteristics of long line 11, which distorts and broadens the input impulses. It is, for example, in such a case that it may be advantageous to provide a short circuit at both line ends, such short circuit having possibly a large attenuation, said attenuation being of sufficient value to allow reflected impulses to be rapidly damped while returning to the opposed end, the line not being necessarily terminated by its characteristic impedance.

As above mentioned it is of no importance, as regards tube 50, that the impulse signals be introduced at the beginning (Fig. 5) or at the end (Fig. 6) of the line, if a line with considerable attenuation is not used.

Such memory loop circuits thus provide in themselves the advantage of necessitating neither a D. C. component recovering circuit nor a pronounced definition of the stored impulses. Moreover, they provide the advantage of being possibly directly combined, according to another feature of the present invention, with carry-over operator devices of the types shown in Figs. 3 and 4, in order to provide the realization of memory loop members totalizing the coded impulse trains, without necessitating the interruption of the loop operation through introduction of impulse train or mixture of impulse trains, whereas an impulse train or mixture of impulse trains has already been stored.

The Figures 5 and 6 being reversible, it is sufficient to describe only one of them, for instance Fig. 5.

As an illustrative example, will be considered a delaying line with eight delay sections each one having an electric length of $\theta$. A coded train representing number 19 is to be introduced.

Considering the graph of Figure 5*a*, this coded train is shown in its arrangement of negative impulses at 52, and is applied to the input terminal of the memory with artificial delaying line.

The input tube 50 will be conductive only when receiving on its negatively biased suppressor grid the positive impulses of the uninterrupted recurrent series of gating pulses indicated at 54. This series is phased with the moments of the train.

The first delay section of the line consists of a half section, of length $\theta/4$ to the short circuit 13, and a half section of length $\theta/2$. This arrangement is the same as that of Fig. 2. The first impulse of the incoming coded train at 52, is applied on tube 50 in phase coincidence with a gating impulse of the series 54 which unlocks tube 50. It is therefore transmitted, in negative polarity, to the plate output 60 of said tube and therefore is applied to the input of the delaying line 11. In the first section of that delaying line, it is converted into a pulse signal with two alternations, just as was any impulse in the delaying line 11 of Figs. 3 and 4. The coded train of pulse signals which travel along the line after all the impulses have been introduced, has the form shown at 11, at the output of the first delaying section of the line.

The total length of the delaying line being $8\theta$, which is the duration of the minor cycle T of the memory with artificial delaying line considered, the coded train of pulse signals again shows up at the following minor cycle $T_1$ in the form shown by the curve 52'.

The negative alternations are all in advance of the gating or unlocking pulses applied to tube 50 and therefore none of them can be transmitted.

However, the positive alternations are all phased with the unlocking pulses 54, and therefore cause negative impulses at the plate of the tube after reshaping both in shape and duration. The coded train of pulsed signals are therefore reconstituted in the same form as in the first minor cycle in the memory line, and so on.

Fig. 7 shows the combination of the carry-over operator device of Fig. 4 with a loop memory member of the type shown in Fig. 5, made of series connected delaying lines 11 and 61, lead 10, tube 50, lead 60 and return path to input tap 14 of line 11 through capacitor 45. Said line 11 has an overall transit time $\theta$, line 61 has a transit time $T-\theta$ (if T is taken as the maximum duration of an N term corrected train to be stored—thus $T=N\theta$). The connection between output tap 15 of line 11 and input tap 70 of line 61 is formed by series-parallel resistor network 63—12. These lines may have different characteristic impedances and series coupling resistance 63 must be so dimensioned as to avoid return of carry impulses applied through terminal 70 to terminal 15. If Z denotes the value of the characteristic impedance of line 11, resistors 12 and 63 may be given the value $Z\sqrt{2}$, with resistor 62 of valve 2Z, to terminate line 61.

Tube 41, detecting the unit multiple levels, has its grid connected, through resistor 20, to output terminal 15 of delaying line 11 and its output is branched, on the one hand through resistor 42 and condenser 45 to terminal 14 of line 11 and, on the other, through resistor 43 and capacitor 47, to input terminal 70 of line 61. The circuit characteristics of said tube 41, therefore the operation of said tube to correct the coded impulse train resulting from mixing at 69 a stored train flowing in through lead 60 with a train to be added, flowing in through terminal 66 and connecting capacitor 67 on separating tube 68, the anode of which is connected to said terminal 69 (resistor 57 serving as a common load for tubes 68 and 50), are such as described with reference to Fig. 4. Input tap 70 of line 61, Fig. 7, fulfills the same function as connection point 33 in Fig. 4, resistor 63 having the same function as resistor 55 in said Figs. 4 and 7.

The operation of the device shown in Fig. 7 is thus easily understood from what has been described about Figs. 3 to 6, and consequently needs no more detailed description. However, it must be noted that the first impulse train to be stored may be applied through terminal 52 to the grid of tube 50, or that two coded impulse trains may be simultaneously introduced respectively through tube 68 and tube 50, the next trains to be added being then introduced through tube 68. At 64 and 65, resistors are shown which do away with the parasite introduction to line 61, through lead 10 and tap 71, of the impulses applied at 52, as well a routing of output impulses from said line towards the source which feeds terminal 52, respectively. The arrangement shown in Figure 7 may be further explained as follows:

This arrangement involves an input tube 68, which is to receive, in positive polarity, the impulses of the train to be registered and added to the train which has already been registered in the memory device.

The plate of said tube 68 is connected to point 69 and plate resistor 57 is common to said input tube 68 and to tube 50 of the memory. The latter tube reshapes the impulses, since it is conductive only when its suppressor grid, which normally is highly negatively biased, receives clipping positive impulses which are well defined in time.

Point 69 which is common to both tubes 68 and 50 is connected through a coupling capacitor 45 to the input tap 14 of the first section of a total delay 0, of the memory delay line. This first section terminates at one of its ends on a short-circuit 13, electrically spaced $\theta/4$ from tap 14; on the other side of tap 14, the portion of the delay line of this first section has an electrical length of $\theta/2$ to tap 15; it is terminated on a shunt impedance 12, the value of which is for instance of $Z\sqrt{2}$. This first section 11 is then connected to the second section 61 through a series resistor 63, the value of which is also preferably equal to $Z\sqrt{2}$, Z being the characteristic impedance of line 11. The output terminal 71 of the second delay section 61, the length of which is $T-\theta$, is connected to the grid of tube 50 through connection 10 and resistor 64, the value of which is sufficiently high so that a signal eventually applied to the grid of tube 50 at terminal 52 and through a resistor 65, will be weakened so as to be negligible when it reaches terminal 71. This makes it possible, whenever desired, to register a coded train by applying it directly on the grid of tube 50 (see Figs. 5 and 6).

The line section 61 is terminated on its characteristic impedance 62 in order to prevent reflection of pulses at this end.

Output tap 15 of the first section 11 of the memory delay line is also connected, through a resistor 20, to the grid of a tube 41. This tube is biased, for instance, by a cathode battery 22 in order that its lower working threshold should allow only the impulses of a level greater than the level arbitrarily defined as a unit level at that point to be amplified. The plate characteristic of that tube provides a limitation (plate bottoming) of any delivered impulse. Anyway, the level of this limitation is greater than the level which is arbitrarily taken as a double unity level at that point.

From the plate of tube 41, through resistor 42, this impulse is fed back to terminal 69, and is weakened so that it is of unit level at point 69. Through capacitor 47 and resistor 43, this same impulse is supplied to point 70 and is weakened so that it provides the level defined as being twice the unit at this point 70, but reversed in polarity with regard to the signal of double unit level supplied from point 15 of section 11 through 63 to tap 70.

Figure 7A:
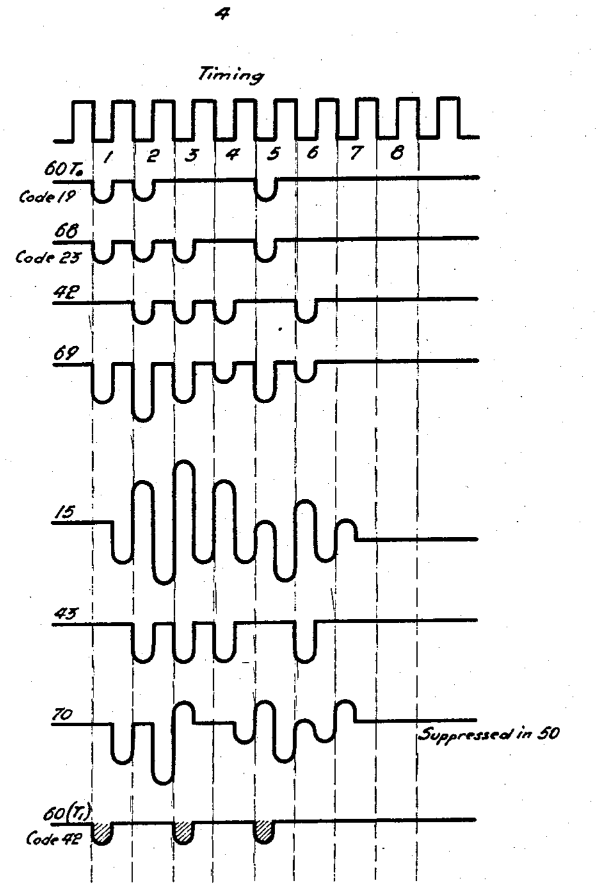

In considering a numerical example it will be assumed that there already exists in the memory device a train of impulses which represents, in binary numeration, the number 19, see the pulses on line 60 of Fig. 7*a*, and that, through input tube 68, a coded train of impulses representing the number 23 is introduced at 66, see the pulses on line 68 of Fig. 7*a*: the direct adding in levels of amplitude of both impulse trains results in the train of rough result given on line 69 of Fig. 7*a*. This train, at the output end of section 11, has the configuration represented at line 15 of Fig. 7*a*, the portion of the signal which is situated below the axis representing the train (69) shifted by $\theta/2$ after having directly passed from tap 14 to tap 15, the portion of the signal which is situated above the axis representing the same train shifted by $\theta$, and reversed in polarity while going from tap 14 to end 13, where it is reflected and reversed in polarity and returns over delay line 11 to tap 15.

Since tube 41 delivers impulses only for positive alternations of diagram 15 which are greater than unit level, resistor 42 feeds back to point 69 the train of carry-over impulses indicated on line 42 of Fig. 7*a*, and the pulses on line 69 shows the direct sum of the pulses of lines 60, 68 and 42.

On the other hand, the impulses of double unit level which are indicated in line 43 of Fig. 7*a* are carried back to point 70 through resistor 43 and the algebraical sum of these impulses and of train 15 gives a signal shown in line 70 of Fig. 7*a*.

This signal is shifted by $T-\theta$ and comes out of section 61 in this form at 71, except for the normal weakening of the delay line. It is carried on to the grid of tube 50. Since this tube is conductive only at the timing moments, it comes out at 60 during the following major cycle, these impulses appearing in line 60 (T1) of Fig. 7*a* and effectively representing the binary number 42.

The carry-over operator circuit centered on the one tube 41, Fig. 7, may, of course, be substituted by a carryover operator circuit comprising two separate tubes 21 and 27, Fig. 3, which simplifies the dimensioning of the resistors as above mentioned.

According to another embodiment, which, besides, may be operated in connection with either of the above mentioned carry-over operator devices is diagrammatically shown in Fig. 8. Such embodiment basically consists in the insertion of a coupling tube 72 between lines 11 and 81, the latter being substituted for line 61 of Fig. 7 and having the structure shown in the diagram of Fig. 2 and being dimensioned as indicated, to re-insert the conversion into a two alternations impulse signal of any impulse issued from tube 72 with only one impulse polarity, coupling tube 72 effectively exciting tap 84 of line 81 through capacitor 73 (the anode resistance of tube 72 is shown at 74). In such a device, the correction of the train resulting from a totalizing mixture is thus entirely performed prior to the exciting of the grid of coupling tube 72, at 76, resistor 75 which connects this grid to output terminal 15 of line 11 fulfilling the same function as resistor 35, as diagrammatically shown in Fig. 4. The remaining operation may be easily imagined with reference to the preceding description. The main advantage of the device consists in the more easily realised branching at the output of tube 41, due to the fact that the impedance of mixing network 75—43 is higher than in the preceding case and, moreover, in the possibility of tolerating, in delaying lines 11 and 81, a more considerable attenuation, whence a more economical construction (whether the carry operator circuits comprises one or two tubes).

In Fig. 8, there is no change in the input circuit of tube 68 nor in the circuit which is controlled by tube 50. The only change in section 11 of the delay line is that this section is made independent of the following section 81; therefore, the characteristic impedance 12 terminates this section 11 in the same manner as in Figs. 2, 3, 4 and 7.

At tap 15 of section 11, a connection is taken by resistor 75 to the grid of a separating tube 72 which re-forms the impulses in receiving the timing pulses on one of its grids through tap 54. This timing is in phase with that received by tube 50, whence the same numerical reference 54. The control grid of tube 72 receives the train of impulses supplied from resistor 43 of the level discriminating stage. The plate of tube 72 is connected to the input terminal 84 of the second section 81 of the delay line. This section comprises a short-circuit 83 at one end and its characteristic impedance 82 across the other end; output tap 85 of section 81 is connected to the control grid of tube 50. Input terminal 84 of said delay line 81 is at $\theta/4$ from shortcircuit 83, and its tap 85 is at $T-1, 5\theta$ from said input tap 84.

Figure 8A:
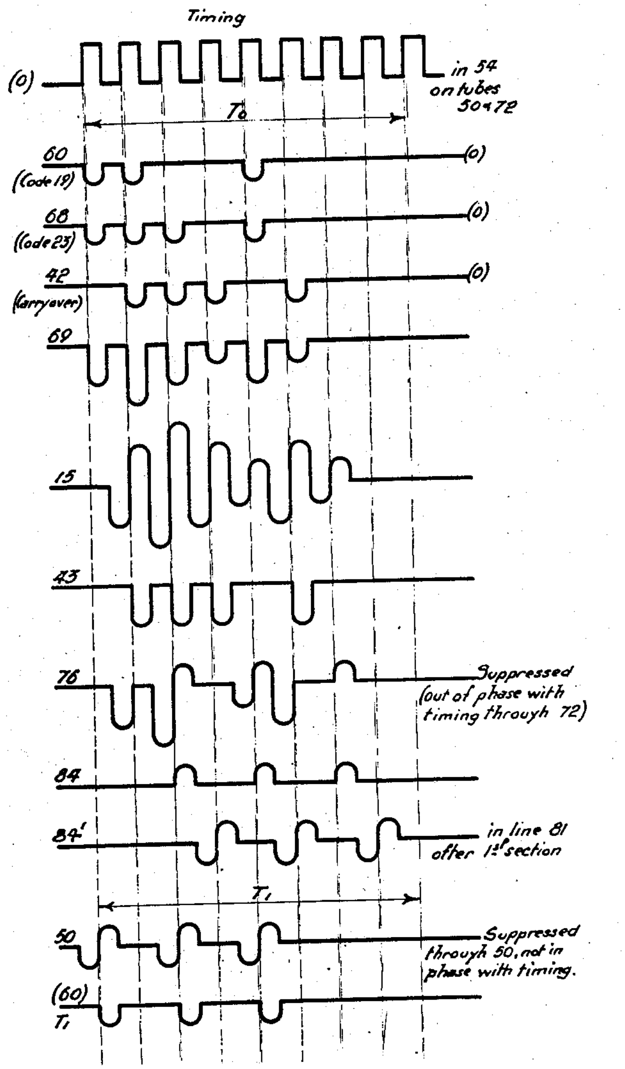

In considering the same example given above, and referring to Fig. 8*a*, the three impulse trains of lines 60, 68 and 42 are the same as these appearing on the diagrams of Fig. 7*a* corresponding to Figure 7, and the waveforms in line 15, and at 43 are also the same. In line 76 is shown the pulses on the control grid of tube 72, that is, the waveform resulting from the addition of the train which is supplied over resistor 75 and which is illustrated in line 15, together with the annulling train supplied over resistor 43. This waveform is identical to that indicated in line 70 of Fig. 7*a*.

In this waveform, the negative alternations, out of phase with the timing in 54, are cancelled, so that the signal arriving at 84 carries only the positive alternations appearing in line 84 of Fig. 8*a*. In other words, the rectification of the result of the addition has been carried out in this first circuit.

Each impulse 84 is directly transmitted to tap 85 and also to shortcircuit 83 which reflects it in reversed polarity. At a distance equal to 0 to the right of tap 84 of delay line 81, the configuration of the waveform of the signal which is progressing along section 81 is shown in line 84 of Figure 8*a*.

Since the distance between 84 and 85 is taken equal to $T-1, 5\theta$, when reaching the control grid of tube 50, only the positive alternations of this waveform are transmitted, their polarity being reversed, such as appears in line 50, and the plate of tube 50 therefore delivers a waveform 60 (T1) during the following major cycle, to point 69.

It must be also noted, in connection with the devices in which a carry-over operator device and a memory loop device are combined, that a duration regeneration by timing impulses, for the impulses being transmitted in the device, additionally to that existing in tube 50, is provided on the tube (or tubes) of the carry-over operator circuit. In cases where a coupling tube is used between the lines, the series of duration regeneration impulses will be most advantageously applied to said tube.

Of course, when a totalization by subtraction of two coded impulse trains is desired, the prior conversion of one of the trains into its complementary train at the maximum order to be stored, is obtained by any known means.

Fig. 8 shows a complement of the above described dispositions: a tube 86 has its grid in parallel to that of tube 50 on lead 10. This tube 86, which is also unlocked at the desired timing through another of its grids, as shown at 54 (this reference number being used on all diagrams in connection to the same function) makes it possible to pick-up the signals going through the described memory loop, at the output 87 of said memory loop.

What I claim is:

1. In a system for correcting an impulse train representing the rough product of a totalizing operation into a train representing the net product of said totalizing operation, the combination of a transmission channel having a delay network connected thereto and serving to reflect energy back into said channel at an echo time of substantially half the timing interval between impulses of said coded train, means connected to the output of said channel for detecting pulses of amplitude above a predetermined level, and means for introducing a pulse at the input of said channel for each detected pulse.

2. In a system for the transmission of coded unipolar electric impulse trains, an arrangement for converting said unipolar pulses into double-pulse signals of opposite polarity, comprising a delay line having one end thereof short-circuited, an input connection to a tap on said delay line spaced from said short-circuited end a distance to produce an echo time equal substantially to half the timing interval between the impulses of said coded train, means connected to the other end of said delay line for detecting pulses of amplitude above a predetermined level, and means for supplying to the input of said line a pulse of unit amplitude for each detected pulse and of the same polarity as the unipolar pulses supplied to the input of said delay line.

3. A system according to claim 2 and including means responsive to each detected pulse for supplying to the output of said line a pulse of double-unit level and of a polarity opposite to the pulses supplied from said delay line.

References Cited in the file of this patent

UNITED STATES PATENTS

| Number | Name | Date |
|---|---|---|
| 2,212,173 | Wheeler et al. | Aug. 20, 1940 |
| 2,217,957 | Lewis | Oct. 15, 1940 |
| 2,493,379 | Anderson et al. | Jan. 3, 1950 |
| 2,587,741 | Libois | Mar. 4, 1952 |